United States Patent
Fu

(10) Patent No.: US 9,385,628 B2
(45) Date of Patent: *Jul. 5, 2016

(54) MULTILEVEL INVERTER DEVICE AND OPERATING METHOD

(71) Applicant: FutureWei Technologies, Inc., Plano, TX (US)

(72) Inventor: Dianbo Fu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/217,013

(22) Filed: Mar. 17, 2014

(65) Prior Publication Data

US 2015/0263644 A1   Sep. 17, 2015

(51) Int. Cl.
 *H02M 3/335* (2006.01)
 *H02M 7/48* (2007.01)
 *H02M 7/487* (2007.01)

(52) U.S. Cl.
 CPC ............... *H02M 7/48* (2013.01); *H02M 7/487* (2013.01)

(58) Field of Classification Search
 CPC ..... H02M 7/48; H02M 7/487; H02M 7/5387; H02M 7/49; H02M 7/483; H02M 7/493; H02M 7/537; H02M 2007/4822; H02M 2007/4835
 USPC .................................... 363/95–100, 131, 132
 See application file for complete search history.

(56) References Cited

U.S. PATENT DOCUMENTS

| 2013/0094260 A1* | 4/2013 | Martini | H02M 7/483 363/97 |
| 2015/0256104 A1* | 9/2015 | Fu | H02M 7/537 363/131 |

FOREIGN PATENT DOCUMENTS

| CN | 102904471 A | 1/2013 |
| CN | 103023363 A | 4/2013 |
| CN | 103532420 A | 1/2014 |
| EP | 2372893 A1 | 10/2011 |

OTHER PUBLICATIONS

Internation Search Report & Written Opinion of Patent Cooperation Treaty (PCT), Application No. PCT/CN2015/073961, Applicant: Huawei Technologies Co., Ltd., date of mailing May 28, 2015, 14 pages.

* cited by examiner

*Primary Examiner* — Yemane Mehari
(74) *Attorney, Agent, or Firm* — Slater Matsil, LLP

(57) ABSTRACT

An inverter comprises a first boost apparatus, a second boost apparatus, a first converting stage coupled to the first boost apparatus, wherein the first converting stage is configured such that a first three-level conductive path is formed when a voltage at a dc source is greater than an instantaneous value of a voltage at an output of the inverter and a first five-level conductive path is formed when the instantaneous value of the voltage at the output of inverter is greater than the voltage at the dc source.

20 Claims, 8 Drawing Sheets

MULTILEVEL INVERTER DEVICE AND OPERATING METHOD

TECHNICAL FIELD

The present invention relates to a multilevel inverter device and method, and, in particular embodiments, to a five-level inverter.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. In order to regulate the output of the solar panels, the output of the solar panels may be coupled to a dc/dc converter so as to achieve a regulated output voltage at the output of the dc/dc converter. In addition, the solar panels may be connected with a backup battery system through a battery charge control apparatus. During the day, the backup battery is charged through the output of the solar panels. When the power utility fails or the solar panels are an off-grid power system, the backup battery provides electricity to the loads coupled to the solar panels.

Since the majority of applications may be designed to run on 120 volts ac power, a solar inverter is employed to convert the variable dc output of the photovoltaic modules to a 120 volts ac power source. A plurality of multilevel inverter topologies may be employed to achieve high power as well as high efficiency conversion from solar energy to utility electricity. In particular, a high power ac output can be achieved by using a series of power semiconductor switches to convert a plurality of low voltage dc sources to a high power ac output by synthesizing a staircase voltage waveform.

In accordance with the topology difference, multilevel inverters may be divided into three categories, namely diode clamped multilevel inverters, flying capacitor multilevel inverters and cascaded H-bridge multilevel inverters. Furthermore, multilevel inverters may employ different pulse width modulation (PWM) techniques such as sinusoidal PWM (SPWM), selective harmonic elimination PWM, space vector modulation and the like. Multilevel inverters are a common power topology for high and medium power applications such as utility interface for renewable power sources, flexible ac transmission systems, medium voltage motor drive systems and the like.

The diode clamped multilevel inverter is commonly referred to as a three-level neutral point clamped (NCP) inverter. A three-level NCP inverter requires two series connected capacitors coupled between the input dc buses. Each capacitor is charged to an equal potential. Furthermore, the three-level NCP inverter may comprise four switching elements and two clamping diodes. The clamping diodes help to reduce the voltage stress on the switching element to one capacitor voltage level.

An NCP inverter utilizes a staircase waveform to generate an ac output. Such a staircase waveform resembles a desired sinusoidal waveform. As a result, the output voltage of the NCP inverter may be of a low total harmonic distortion (THD). In addition, the staircase waveform may reduce the voltage stresses. As a result, the electromagnetic compatibility (EMC) performance of the NCP inverter may be improved. In addition, to achieve the same THD, the NCP inverter may operate at a lower switching frequency. Such a lower switching helps to reduce switching losses so as to achieve an efficient power conversion system.

SUMMARY OF THE INVENTION

These and other problems are generally solved or circumvented, and technical advantages are generally achieved, by preferred embodiments of the present invention which provide an apparatus of multilevel inverters in solar applications.

In accordance with an embodiment, a method comprises detecting a voltage across a dc source coupled to an inverter, wherein the inverter comprises a first boost apparatus having an input coupled to a first terminal of the dc source, a second boost apparatus having an input coupled to a second terminal of the dc source, a first converting stage comprising a first three-level conductive path and a first five-level conductive path, a second converting stage comprising a second three-level conductive path and a second five-level conductive path and a freewheeling network coupled between an input of an output filter and ground.

The method further comprises in a first half cycle of a voltage at an output of the output filter, enabling the first three-level conductive path when a voltage at the first terminal of the dc source is greater than an instantaneous value of the voltage at the output of the output filter, in the first half cycle, enabling the first five-level conductive path when the instantaneous value of the voltage at the output of the output filter is greater than the voltage at the first terminal of the dc source, in a second half cycle of the voltage at the output of the output filter, enabling the second three-level conductive path when the instantaneous value of the voltage at the output of the output filter is greater than the voltage at the second terminal of the dc source and in the second half cycle, enabling the second five-level conductive path when the voltage at the second terminal of the dc source is greater than the instantaneous value of the voltage at the output of the output filter.

In accordance with another embodiment, a method comprises providing an inverter coupled to a dc source, wherein the inverter comprises a first boost apparatus having an input coupled to a first terminal of the dc source, a second boost apparatus having an input coupled to a second terminal of the dc source, a first converting stage comprising a first three-level conductive path coupled to the first terminal of the dc source and a first five-level conductive path coupled to the first terminal of the dc source and an output of the first boost apparatus, a second converting stage comprising a second three-level conductive path coupled to the second terminal of the dc source and a second five-level conductive path coupled to the second terminal of the dc source and an output of the second boost apparatus and a freewheeling network coupled between an input of an output filter and ground and turning on a plurality of relays to bypass the first boost apparatus and the second boost apparatus when a voltage across the dc source is greater than a peak-to-peak value of a voltage at an output of the output filter.

In accordance with yet another embodiment, an inverter comprises a first boost apparatus having an input coupled to a first terminal of a dc source, a second boost apparatus having an input coupled to a second terminal of the dc source, a first converting stage coupled to an input of an output filter and the first boost apparatus, wherein the first converting stage is configured such that a first three-level conductive path is coupled between the first terminal of the dc source and the input of the output filter when a voltage at the first terminal of the dc source is greater than an instantaneous value of a voltage at an output of the output filter and a first five-level conductive path is coupled to the first terminal of the dc source and an output of the first boost apparatus when the instantaneous value of the voltage at the output of the output filter is greater than the voltage at the first terminal of the dc source, a second converting stage coupled to the input of the output filter and a freewheeling apparatus coupled between the input of the output filter and ground.

An advantage of an embodiment of the present invention is generating a staircase waveform using a hybrid inverter comprising a three-level inverter structure and a five-level inverter structure. Such a hybrid inverter helps to improve the efficiency, reliability and cost of multilevel inverters.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a five-level inverter. The invention may also be applied, however, to a variety of power converters including multilevel rectifiers, multilevel inverters, multilevel ac-to-ac converters and the like. Furthermore, the invention may also be applied to a variety of three-phase multilevel inverters.

Figure 1:
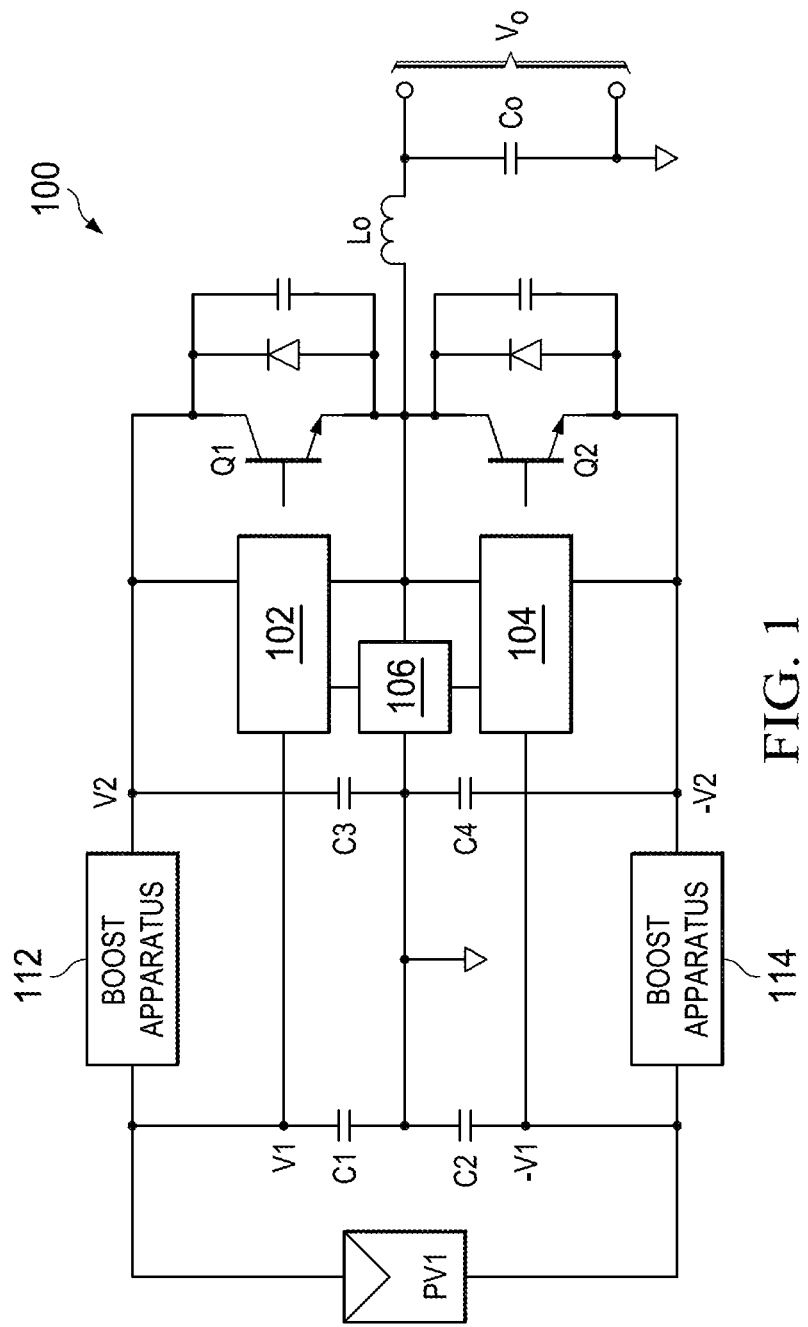
FIG. 1 illustrates a block diagram of a multilevel inverter in accordance with various embodiments of the present disclosure.

FIG. 1 illustrates a block diagram of a multilevel inverter in accordance with various embodiments of the present disclosure. The multilevel inverter 100 comprises a dc source PV1, a first boost apparatus 112 coupled between a first terminal of the dc source PV1 and ground, a second boost apparatus 114 coupled between a second terminal of the dc source PV1 and ground, a freewheeling apparatus 106, a first converting stage 102 and a second converting stage 104.

The dc source PV1 shown in FIG. 1 may be implemented as a solar panel. More particularly, in some embodiments, while FIG. 1 illustrate a single dc source PV1, the dc source PV1 may comprise a plurality of solar panels connected in series, in parallel, any combinations thereof and the like. Two input capacitors C1 and C2 are connected in series. As shown in FIG. 1, the series-connected input capacitors C1 and C2 are coupled to the output terminals of the dc source PV1. In some embodiments, the common node of the input capacitors C1 and C2 is connected to ground as shown in FIG. 1.

The multilevel inverter 100 comprises five voltage levels (e.g., V1, −V1, V2, −V2 and ground). A first terminal of the dc source PV1 is of an output voltage V1. A second terminal of the dc source PV1 is of an output voltage −V1. The first boost apparatus 112 and the second boost apparatus 114 are coupled to the first terminal and second terminal of the dc source PV1 respectively. In addition, the first boost apparatus 112 and the second boost apparatus 114 convert the output voltages V1 and −V1 of the first terminal and the second terminal of the dc source PV1 to V2 and −V2 respectively as shown in FIG. 1.

The first boost apparatus 112 and the second boost apparatus 114 may be implemented by using step up circuits such as boost dc/dc converters and/or the like. A boost dc/dc converter is formed by an input inductor, a low side switch and a blocking diode. The detailed configuration of the boost dc/dc converter will be described below with respect to FIG. 2.

It should be noted that while FIG. 1 illustrates the multilevel inverter 100 with two boost apparatuses (e.g., the first boost apparatus 112 and the second boost apparatus 114), the multilevel inverter 100 could accommodate any number of boost apparatuses. The number of boost apparatuses illustrated herein is limited solely for the purpose of clearly illustrating the inventive aspects of the various embodiments. The present invention is not limited to any specific number of boost apparatuses. One of ordinary skill in the art would recognize many variations, alternatives, and modifications. For example, additional boost apparatuses may be employed to achieve an output staircase waveform having additional voltage levels (e.g., sever-level inverter).

The multilevel inverter 100 may further comprise an output filter formed by an inductor Lo and a capacitor Co, and a plurality of switches Q1 and Q2. As shown in FIG. 1, the input of the output filter is coupled to the common node of the switches Q1 and Q2. While FIG. 1 shows the switches Q1 and Q2 may be coupled to V2 and −V2 respectively, the switches Q1 and Q2 may be coupled to V1 and −V1 respectively through the first converting stage 102 and the second converting stage 104. The detailed operation principles of the first converting stage 102 and the second converting stage 104 will be described below in detail with respect to FIGS. 3-8.

In accordance with an embodiment, the switches (e.g., switches Q1 and Q2) may be an insulated gate bipolar transistor (IGBT) device. Alternatively, the switching element can be any controllable switches such as metal oxide semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

The freewheeling apparatus 106 may be coupled between the input of the output filter and ground. In some embodiments, the first freewheeling route may provide a conductive path for the current flowing in the switches (e.g., switch Q1) after the switches are turned off. The detailed structure of the freewheeling apparatus 106 will be described below with respect to FIG. 2.

The first converting stage 102 and the second converting stage 104 may comprise a plurality switches. Each switch is configured such that a staircase waveform is generated at the input of the filter by using different combinations of the switches. In some embodiments, a portion of the converting stage may be enabled. The converting stage functions as a three-level inverter structure. In alternative embodiments, depending on the voltage at the outputs of the dc source PV1, another portion of the converting stage may be activated. The converting stage may comprise both a three-level inverter structure and a five-level inverter structure. The detailed operation of the first converting stage 102 and the second converting stage 104 will be described below with respect to FIGS. 2-8.

Figure 2:
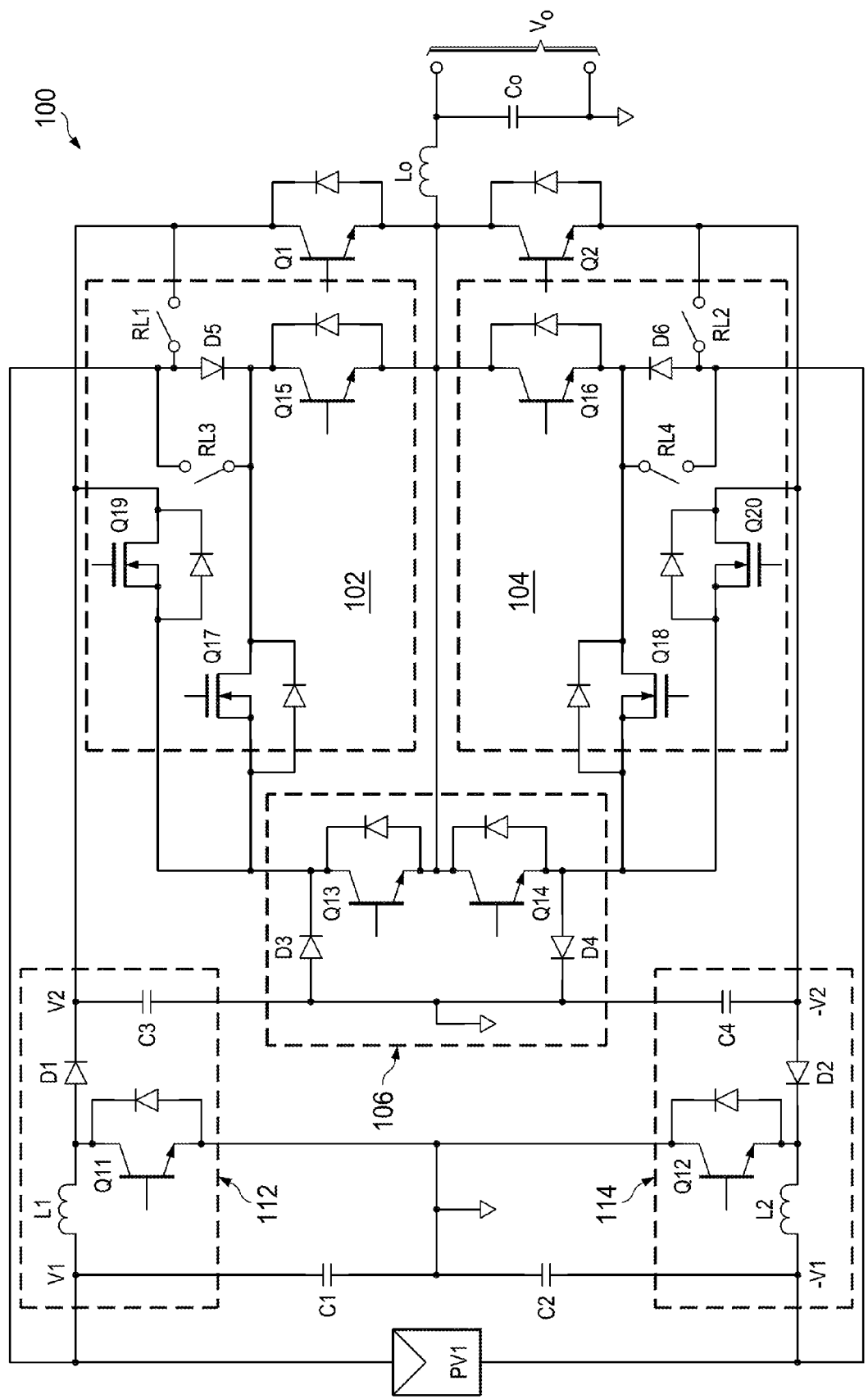
FIG. 2 illustrates a schematic diagram of the multilevel inverter shown in FIG. 1 in accordance with various embodiments of the present disclosure.

FIG. 2 illustrates a schematic diagram of the multilevel inverter shown in FIG. 1 in accordance with various embodiments of the present disclosure. The multilevel inverter 100 comprises the first boost apparatus 112 generating an output voltage V2 higher than the input voltage V1 from the dc source PV1. Moreover, the second boost apparatus 114 is employed to generate a negative voltage −V2.

Both the first boost apparatus 112 and the second boost apparatus 114 are implemented as boost dc/dc converters. For simplicity, only the first boost apparatus 112 will be described in detail below.

As shown in FIG. 2, the first boost apparatus 112 is formed by an input inductor L1, a low side switch Q11, a blocking diode D1 and an output capacitor C3. A controller (not shown) may control the turn-on duty cycle of the low side switch Q11 so as to regulate the output voltage V2 across the output capacitor C3. The detailed operation principles of boost dc/dc converters are well known in the art, and hence are not discussed in further detail to avoid unnecessary repetition.

It should be noted that boost dc/dc converters are merely an example to implement the first boost apparatus 112 and the second boost apparatus 114. Other boost topologies are also within the contemplated scope of the invention. A boost dc/dc converter is simply one manner of generating a higher voltage from the dc source (e.g., V1) and that other and alternate embodiment boost topologies could be employed (such as employing a switched capacitor voltage doubler) and that other circuits, (e.g., a charge pump voltage doubler, etc.) could be employed for this function.

The first converting stage 102 comprises switches Q15, Q17 and Q19, relays RL1 and RL3, and diode D5. The first converting stage 102 is activated during a first half cycle of the output ac waveform Vo. The second converting stage 104 comprises switches Q16, Q18 and Q20, relays RL2 and RL4, and diode D6. The second converting stage 104 is activated during a second half cycle of the output ac waveform Vo.

The first converting stage 102 may function as either a three-level inverter structure or a five-level inverter structure by configuring the switches of the first converting stage 102. In particular, when the peak voltage of the output voltage Vo is greater than V1, the first converting stage 102 may enter either a three-level inverter operation mode or a five-level inverter operation mode depending on the voltage of V1. More particularly, in one complete cycle, when V1 is greater than the instantaneous value of Vo, the first converting stage 102 may enter a three-level inverter operation mode. Otherwise, the first converting stage 102 may enter a five-level inverter operation mode.

In the three-level inverter operation mode, Q1 and Q19 are turned off. Q13, Q17 and Q15 are turned on. RL1 and RL3 are turned off. Diode D5 is forward-biased. The turned on Q13, Q17 and Q15 form a three-level inverter structure during the first half cycle. On the other hand, in the five-level inverter operation mode, Q17 is turned off. Q1, Q15, Q13 and Q19 are turned on. Diode D5 is forward-biased. RL1 and RL3 are turned off. The first boost apparatus 112 is activated. The turned on Q1, Q13, Q15 and Q19 form a five-level inverter structure during the first half cycle.

Likewise, the second converting stage 104 may function as either a three-level inverter structure or a five-level inverter structure by configuring the switches of the second converting stage 104. More particularly, in a second half cycle, when the instantaneous value of Vo is greater than −V1, the second converting stage 104 may enter a three-level inverter operation mode. Otherwise, the second converting stage 104 may enter a five-level inverter operation mode.

In the three-level inverter operation mode, Q2 and Q20 are turned off. Q14, Q18 and Q16 are turned on. RL2 and RL4 are turned off. Diode D6 is forward-biased. The turned on Q14, Q18 and Q16 form a three-level inverter structure during the second half cycle. On the other hand, in the five-level inverter operation mode, Q18 is turned off. Q2, Q16, Q14 and Q20 are turned on. Diode D6 is forward-biased. RL2 and RL4 are turned off. The second boost apparatus 114 is activated. The turned on Q2, Q14, Q16 and Q20 form a five-level inverter structure during the second half cycle.

In accordance with an embodiment, in order to improve the switching losses of the multilevel inverter 100, the switches Q17, Q18, Q19 and Q20 may be implemented as MOSFETs. Alternatively, the switches Q17, Q18, Q19 and Q20 may be implemented as other suitable devices such as IGBT and/or the like.

The freewheeling apparatus 106 may comprise switches Q13 and Q14, and diodes D3 and D4. As shown in FIG. 2, the diode D3 and the switch Q13 may form a first freewheeling route connected between the input of the output filter and ground. In some embodiments, the first freewheeling route may provide a conductive path for the current flowing in the switch Q1 after Q1 is turned off.

Likewise, the diode D4 and the switch Q14 may form a second freewheeling route connected between the input of the output filter and ground. In some embodiments, the second freewheeling route may provide a conductive path for the current flowing in the switch Q2 after Q2 is turned off.

It should be noted that the schematic diagram of the freewheeling apparatus 106 described above is merely an exemplary structure and is not meant to limit the current embodiments. One of ordinary skill in the art would recognize many variations, alternatives, and modifications. For example, the diodes D3 and D4 may be replaced by two switches respectively. In addition, while FIG. 2 illustrates that switches Q13 and Q14 may be implemented as IGBT transistors, the switches Q13 and Q14 can be any controllable switches such as MOSFET devices, IGCT devices, GTO devices, SCR devices, JFET devices, MCT devices, any combinations thereof and/or the like.

The relays RL1, RL2, RL3 and RL4 are included to provide one additional operation mode. In particular, when the input voltage (e.g., V1) is higher than the peak voltage of Vo, the first boost apparatus 112 and the second boost apparatus 114 may be bypassed by turning on the relays RL1, RL2, RL3 and RL4. As such, the total power losses of the multilevel inverter 100 may be reduced.

Figure 3:
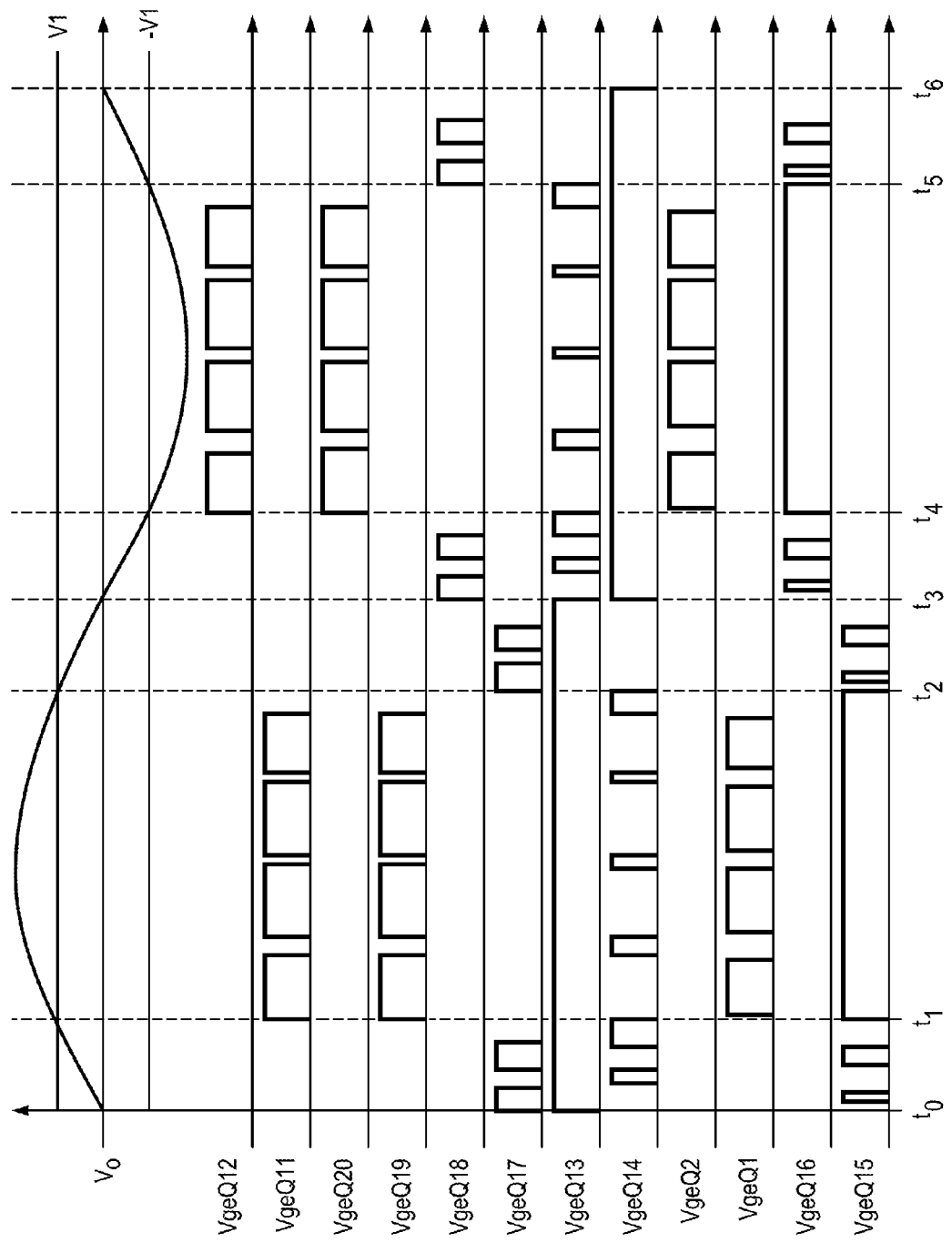
FIG. 3 illustrates a timing diagram of various signals in the multilevel inverter shown in FIG. 2 in accordance with various embodiments of the present disclosure.

FIG. 3 illustrates a timing diagram of various signals in the multilevel inverter shown in FIG. 2 in accordance with various embodiments of the present disclosure. Vo is the voltage waveform at the output of the output filter shown in FIG. 2. As shown in FIG. 2, the output filter is formed by an output inductor Lo and an output capacitor Co. The output filter helps to filter the multilevel PWM voltage (voltage at the input of the output filter) to obtain a sinusoidal waveform as shown in FIG. 3.

According to the sinusoidal waveform Vo, the timing diagram can be divided into two portions, namely a first half cycle and a second half cycle. The first half cycle starts from t0 and ends at t3. The second half cycle starts from t3 and ends at t6. Furthermore, the first half cycle can be divided into three portions according to the relationship between V1 and Vo. More particularly, a first portion starts from t0 and ends at t1. In the first portion, V1 is greater than the instantaneous value of Vo. A second portion starts from t1 and ends at t2. In the second portion, the instantaneous value of Vo is greater than V1. A third portion starts from t2 and ends at t3. In the third portion, V1 is greater than the instantaneous value of Vo.

Throughout the description, the operation mode during the first portion and the third portion of the first half cycle may be alternatively referred to as a three-level inverter operation mode of the first half cycle. Likewise, the operation mode during the second portion of the first half cycle is alternatively referred to as a five-level inverter operation mode of the first half cycle.

Likewise, the second half cycle can be divided into three portions according to the relationship between V1 and Vo. More particularly, a first portion of the second half cycle starts from t3 and ends at t4. In the first portion of the second half cycle, the instantaneous value of Vo is greater than −V1. A second portion of the second half cycle starts from t4 and ends at t5. In the second portion, −V1 is greater than the instantaneous value of Vo. A third portion of the second half cycle starts from t5 and ends at t6. In the third portion, the instantaneous value of Vo is greater than −V1.

Throughout the description, the operation mode during the first portion and the third portion of the second half cycle may be alternatively referred to as a three-level inverter operation mode of the second half cycle. The operation mode during the second portion of the second half cycle is alternatively referred to as a five-level inverter operation mode of the second half cycle. The detailed operation principles of each portion will be described below with respect to FIGS. 4-7.

Figure 4:
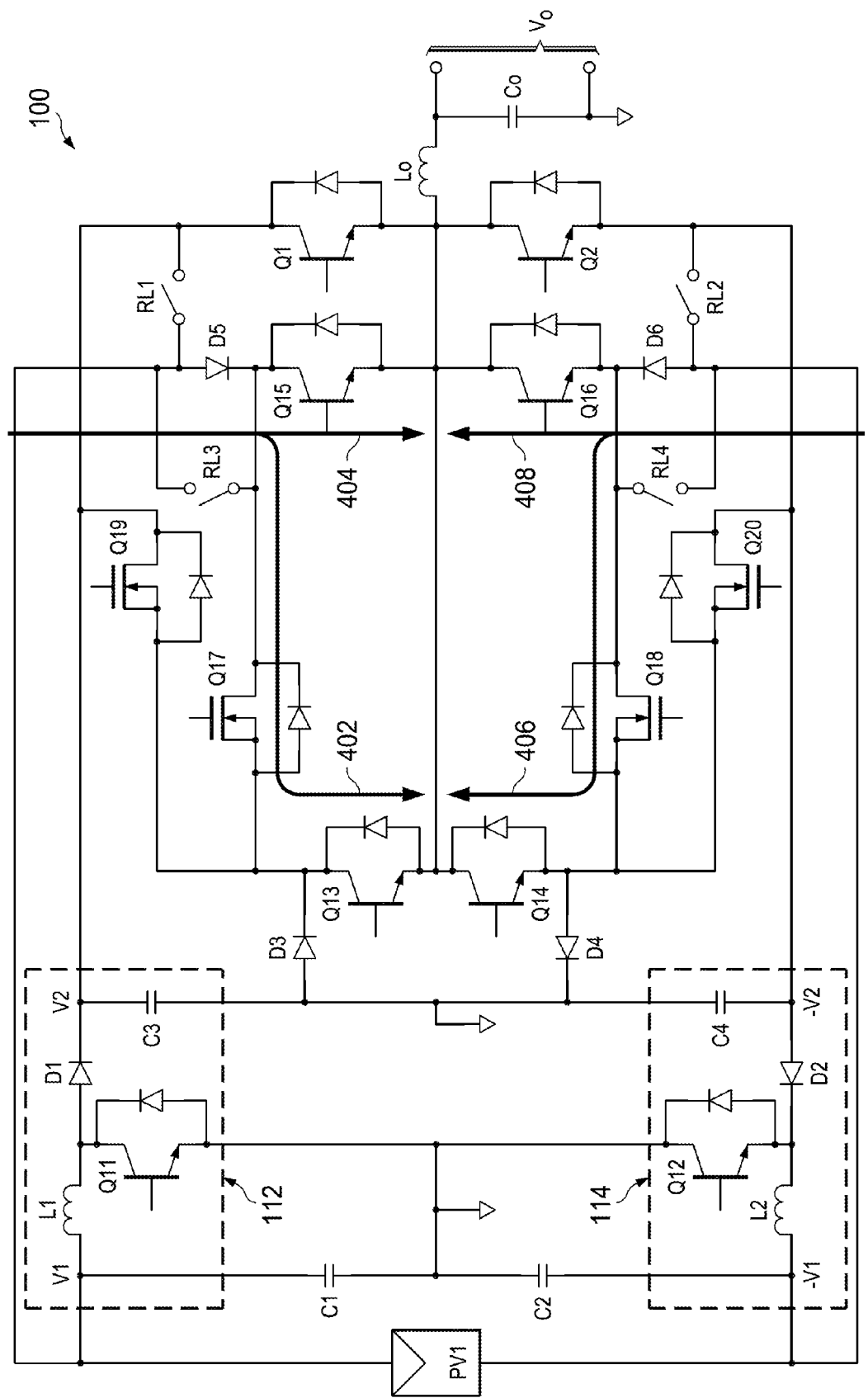
FIG. 4 illustrates a schematic diagram of a system configuration of the three-level inverter operation mode of the multilevel inverter shown in FIG. 2 in accordance with various embodiments of the present disclosure.

FIG. 4 illustrates a schematic diagram of a system configuration of the three-level inverter operation mode of the multilevel inverter shown in FIG. 2 in accordance with various embodiments of the present disclosure. During a first half cycle, when a voltage at the first terminal of the dc source is greater than the instantaneous value of Vo, the multilevel inverter 100 enters a three-level inverter operation mode. A first conductive path is enabled as indicated by arrows 402 and 404 shown in FIG. 4.

The first conductive path is formed by turned on Q13, Q15 and Q17. Q15 is coupled between the input of the output filter and the first terminal of the dc source PV1. Q13 and Q17 are connected in series and coupled between the input of the output filter and the first terminal of the dc source PV1. The current flows from the first terminal of the dc source PV1 to the output filter through two current paths. The first current path comprises Q15. The second current path comprises Q17 and Q13. As shown in FIG. 4, these two current paths are connected in parallel. Moreover, Q17 of the second current path may help Q15 achieve zero voltage switching. The zero voltage switching process will be described below with respect to FIG. 5.

During a second half cycle, when the instantaneous value of Vo is greater than a voltage at the second terminal (e.g., −V1) of the dc source PV1, the multilevel inverter 100 enters a three-level inverter operation mode. A second conductive path is enabled as indicated by arrows 406 and 408 shown in FIG. 4.

The second conductive path is formed by Q16, Q14 and Q18. Q16 is coupled between the input of the output filter and the second terminal of the dc source PV1. Q14 and Q18 are connected in series and coupled between the input of the output filter and the second terminal of the dc source PV1. The operating principle of the second conductive path is similar to that of the first conductive path described above, and hence is not described in detail herein to avoid repetition.

Figure 5:
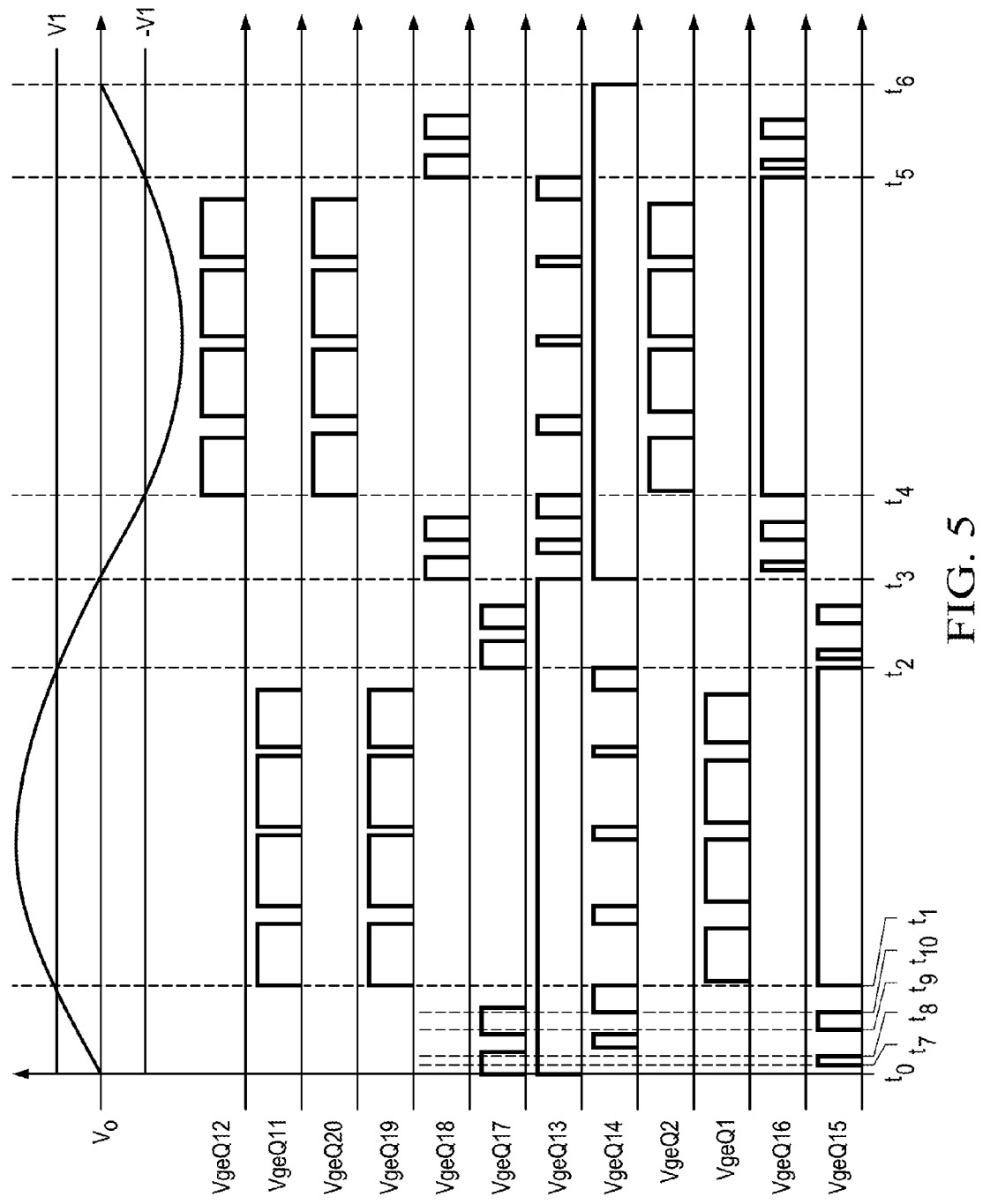
FIG. 5 illustrates a timing diagram of various signals in the multilevel inverter shown in FIG. 4 in accordance with various embodiments of the present disclosure.

FIG. 5 illustrates a timing diagram of various signals in the multilevel inverter shown in FIG. 4 in accordance with various embodiments of the present disclosure. As described above with respect to FIG. 4, the multilevel inverter 100 enters a three-level inverter operation mode during the time interval from t0 to t1, the time interval from t2 to t3, the time interval from t3 to t4 and the time interval from t5 to t6. The gate drive signals in these four time intervals are similar. For simplicity, only the gate signals in the time interval from t0 to t1 will be described below in detail.

During the time interval from t0 to t1, Q17 is turned on at t0 before Q15 is turned on at t7. As shown in FIG. 5, Q13 is always on during this time interval. As a result, the turned-on Q17 and Q13 are connected in series to form a zero voltage switching auxiliary circuit as shown in FIG. 4. At t8, when Q15 is turned off, both Q17 and Q13 are turned on so that the voltage across Q15 is approximately equal to zero. In sum, such a zero voltage switching auxiliary circuit helps Q15 achieve zero voltage switching. Likewise, at t9 and t10, Q15 is able to achieve zero voltage switching.

It should be noted that instead of maintaining Q17 on during the time interval from t7 to t8, switch Q17 may be turned off. More particularly, Q17 may be turned off after Q15 has achieved a zero voltage turn-on transition and turned on prior to Q15's turn-off at t8. It should further be noted that Q18 is able to help Q16 achieve zero voltage switching during the second half cycle. The zero voltage switching transition of Q16 is similar to that of Q15, and hence is not discussed in further detail herein to avoid repetition.

Figure 6:
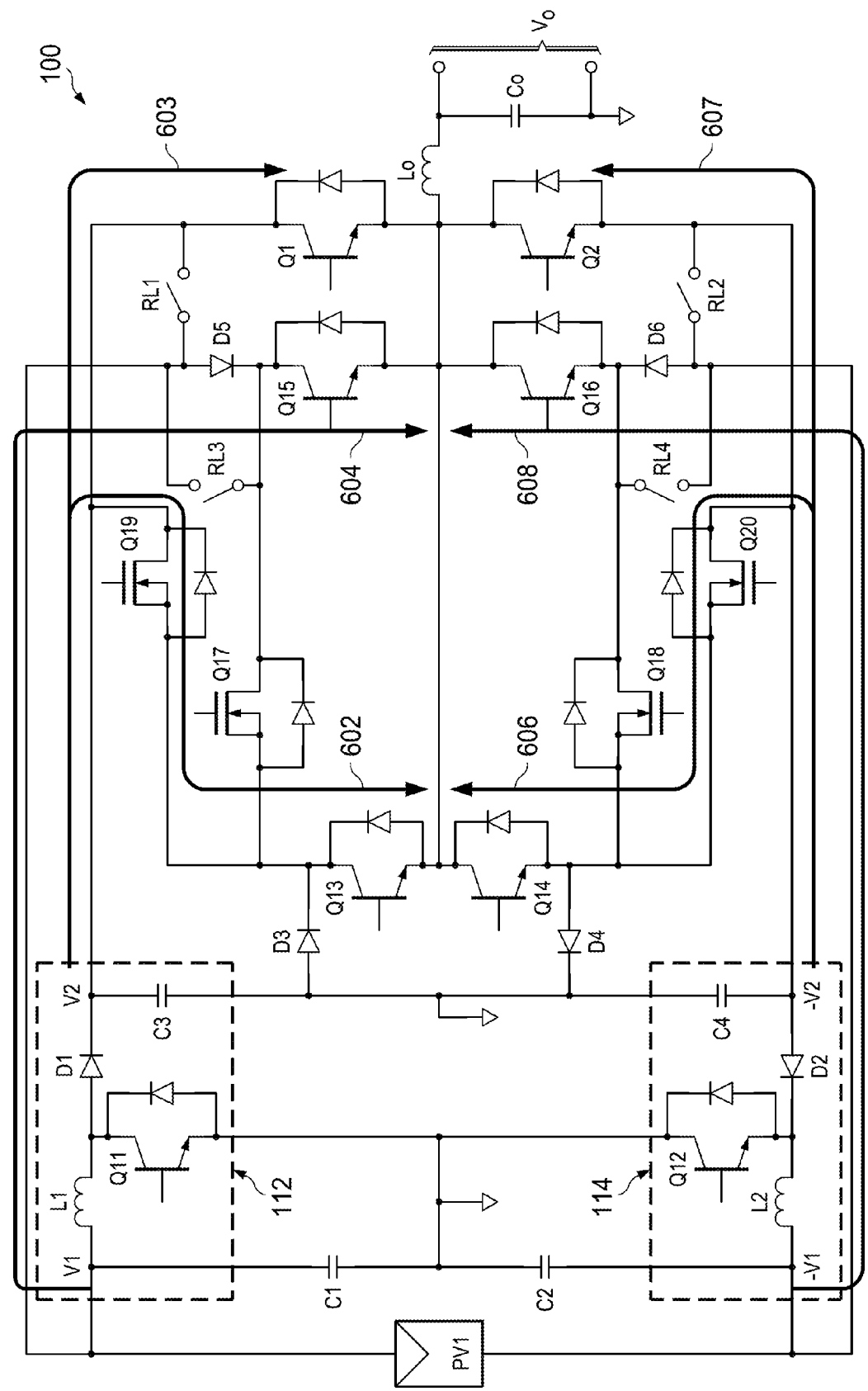
FIG. 6 illustrates a schematic diagram of a system configuration of the five-level operation mode of the multilevel inverter shown in FIG. 2 in accordance with various embodiments of the present disclosure.

FIG. 6 illustrates a schematic diagram of a system configuration of the five-level operation mode of the multilevel inverter shown in FIG. 2 in accordance with various embodiments of the present disclosure. During a first half cycle, when the instantaneous value of Vo is greater than a voltage at the first terminal (e.g., V1) of the dc source PV1, the multilevel inverter enters a five-level inverter operation mode. Two conductive paths are enabled as indicated by arrows 602, 603 and 604 shown in FIG. 6.

The first conductive path is formed by Q15. As shown in FIG. 6, Q15 is coupled between the input of the output filter and the first terminal of the dc source PV1. The second conductive path comprises Q1, Q13 and Q19. Q13 and Q19 are connected in series and coupled between the input of the output filter and the output of the first boost apparatus 112. Q1 is coupled between the input of the output filter and the output of the first boost apparatus 112. The current may flow from the first terminal (V1) of the dc source PV1 to the output filter through Q15. Alternatively, the current flows from the output of the first boost apparatus 112 to the output filter through turned on Q1, Q17 and Q13.

It should be noted that diode D5 may prevent the current flowing through Q15 when there is a current flowing through the second conductive path. It should further be noted Q19 of the second current path may help Q1 achieve zero voltage switching. The zero voltage switching process of Q1 will be described below with respect to FIG. 7.

During a second half cycle, when a voltage at the second terminal (e.g., −V1) of the dc source PV1 is greater than the instantaneous value of Vo, the multilevel inverter 100 enters the five-level inverter operation mode. Two conductive paths are enabled as indicated by arrows 606, 607 and 608 shown in FIG. 6.

The first conductive path is formed by Q16. Q16 is coupled between the input of the output filter and the second terminal (−V1) of the dc source PV1. The second conductive path comprises Q2, Q14 and Q20. As shown in FIG. 6, Q14 and Q20 are connected in series and coupled between the input of the output filter and the output of the second boost apparatus 114. Q1 is coupled between the input of the output filter and the output of the second boost apparatus 114. The operating principle of the conductive paths in the second half cycle is similar to that of the first half cycle, and hence is not described in detail herein.

Figure 7:
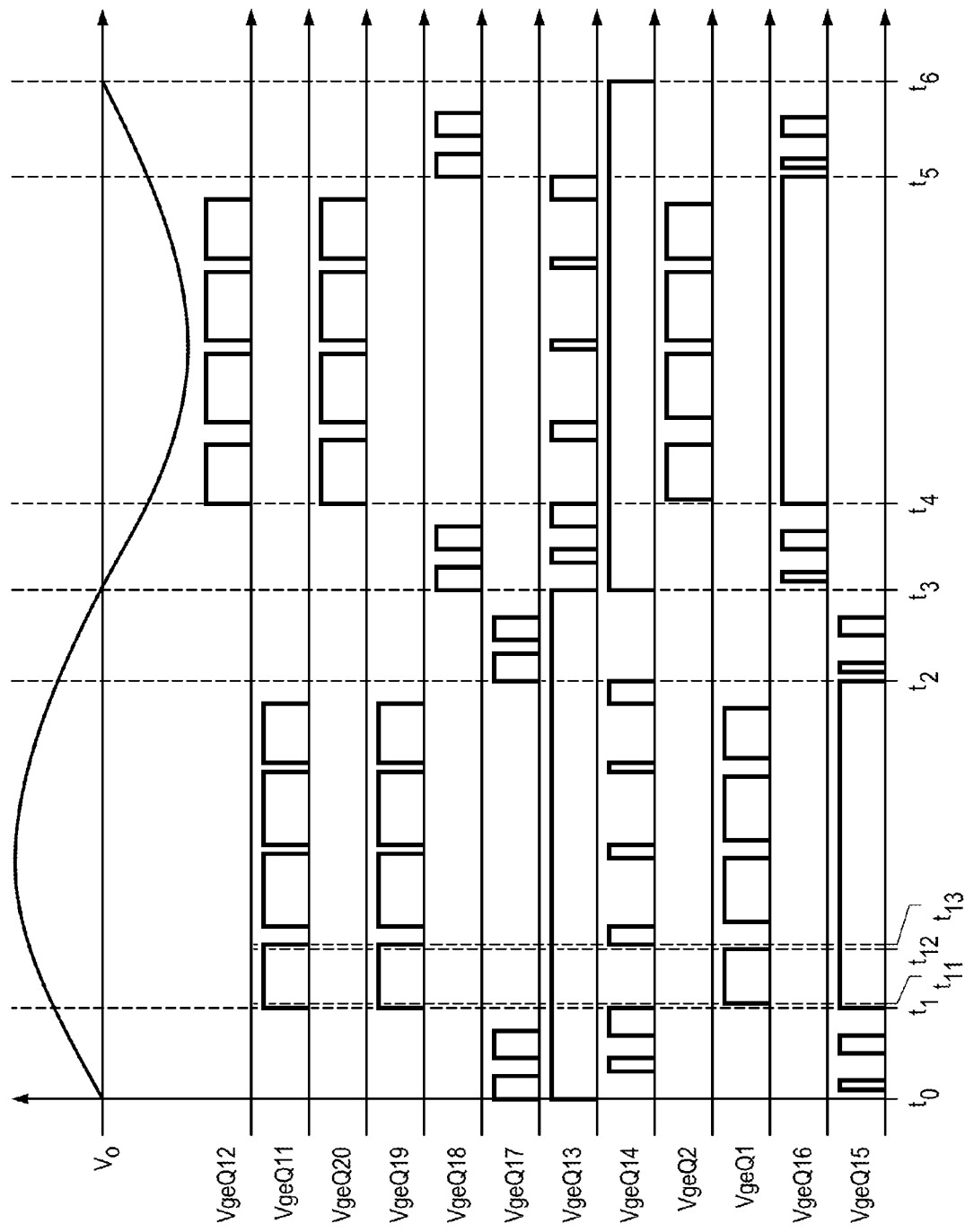
FIG. 7 illustrates a timing diagram of various signals in the multilevel inverter shown in FIG. 6 in accordance with various embodiments of the present disclosure.

FIG. 7 illustrates a timing diagram of various signals in the multilevel inverter shown in FIG. 6 in accordance with various embodiments of the present disclosure. As described above with respect to FIG. 6, the multilevel inverter system enters a five-level inverter operation mode during the time interval from t1 to t2 and the time interval from t4 to t5. The gate drive signals in these two time intervals are similar. For simplicity, only the gate signals in the time interval from t1 to t2 will be described below in detail.

During the time interval from t1 to t2, Q19 is turned on at t1 before Q1 is turned on at t11. As shown in FIG. 7, Q13 is always on during this time interval. As a result, the turned-on Q17 and Q13 are connected in series to form a zero voltage switching auxiliary circuit. At t12, when Q1 is turned off, both Q19 and Q13 are still on so that the voltage across Q1 is approximately equal to zero. Q19 may be turned off at t13. In sum, Q19 helps Q1 achieve zero voltage switching.

It should be noted that instead of maintaining Q19 on during the time interval from t11 to t12, switch Q19 may be turned off. More particularly, Q19 may be turned off after Q1 has achieved a zero voltage turn-on transition and turned on again prior to Q1's turn-off at t12. It should further be noted that Q20 is able to help Q2 achieve zero voltage switching during the second half cycle. The zero voltage switching transition of Q2 is similar to that of Q1, and hence is not discussed in further detail herein to avoid repetition.

Figure 8:
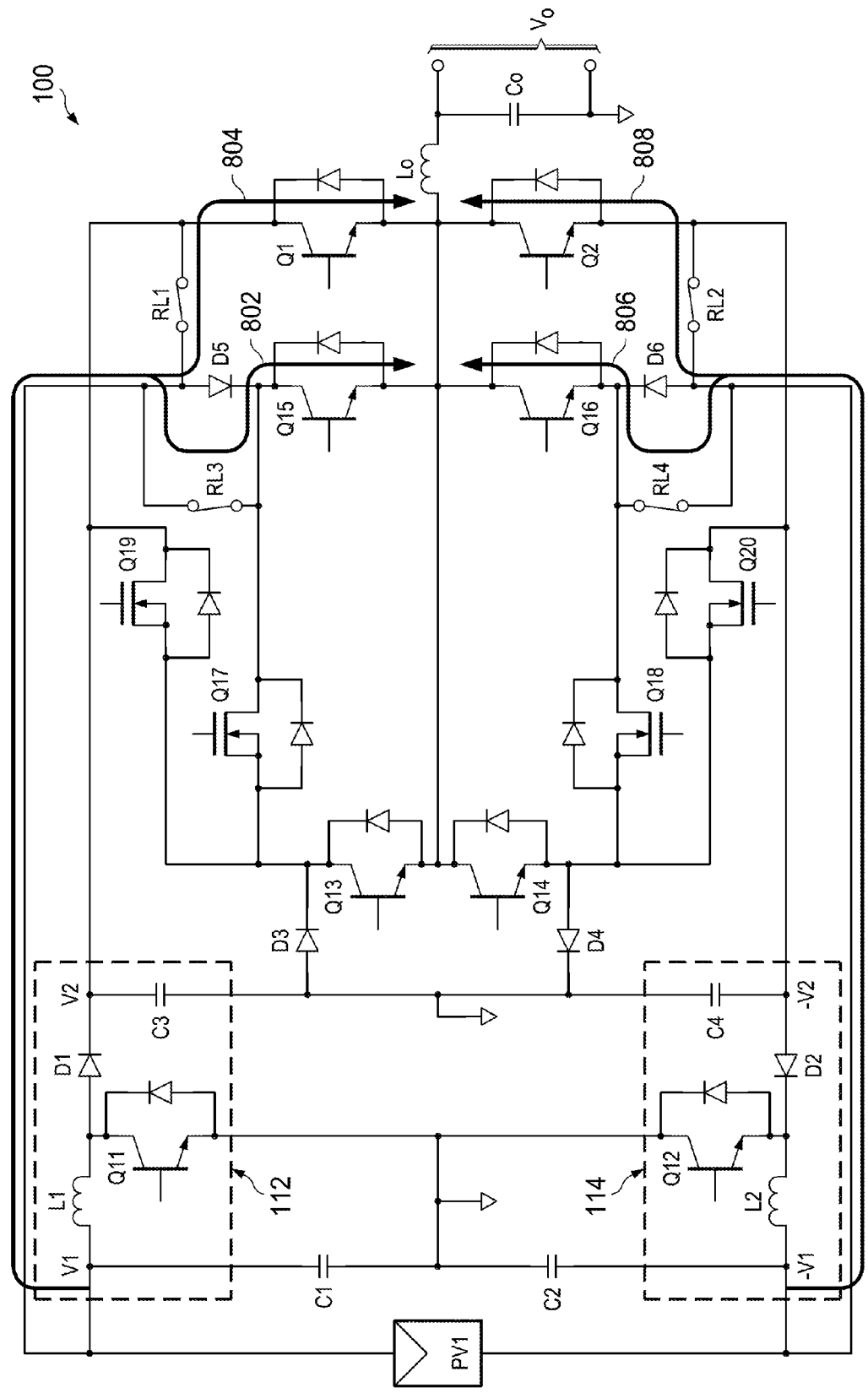
FIG. 8 illustrates a schematic diagram of another system configuration of the multilevel inverter shown in FIG. 2 in accordance with various embodiments of the present disclosure.

FIG. 8 illustrates a schematic diagram of another system configuration of the multilevel inverter shown in FIG. 2 in accordance with various embodiments of the present disclosure. The first boost apparatus 112 and the second boost apparatus 114 are bypassed when a voltage across the dc source PV1 is greater than the peak-to-peak value of Vo. As indicated by arrows 802 and 804, during a first half cycle, the energy is delivered to the output filter through Q1 and Q15. More particularly, the turned on relays RL1 and RL3 create two conductive paths connected in parallel. During a second half cycle, as indicated by arrows 806 and 808, the energy is delivered to the output filter through Q2 and Q16. One advantageous feature of having relays RL1, RL2, RL3 and RL4 is the power losses may be reduced by turning off the first boost apparatus 112 and the second boost apparatus 114. As a result, the efficiency as well as the reliability of the multilevel inverter 100 may be improved.

The first three-level conductive path is formed by Q15 coupled between the input of the output filter and the first terminal of the dc source, and Q13 and Q17 connected in series and coupled between the input of the output filter and the first terminal of the dc source. The first five-level conductive path is formed by Q15 coupled between the input of the output filter and the first terminal of the dc source, Q1 coupled between an output of the first boost apparatus and the input of the output filter, and Q13 and Q19 connected in series and coupled between the output of the first boost apparatus and the input of the output filter. The second three-level conductive path is formed by Q16 coupled between the input of the output filter and the second terminal of the dc source, and Q14 and Q18 connected in series and coupled between the input of the output filter and the second terminal of the dc source. The second five-level conductive path is formed by Q16 coupled between the input of the output filter and the second terminal of the dc source, Q2 coupled between an output of the second boost apparatus and the input of the output filter, and Q14 and Q20 connected in series and coupled between the output of the second boost apparatus and the input of the output filter.

The first three-level conductive path is formed by a first switch coupled between the input of the output filter and the first terminal of the dc source, and a second switch and a third switch connected in series and coupled between the input of the output filter and the first terminal of the dc source. The first five-level conductive path is formed by the first switch coupled between the input of the output filter and the first terminal of the dc source, a fourth switch coupled between an output of the first boost apparatus and the input of the output filter, and the second switch and a fifth switch connected in series and coupled between the output of the first boost apparatus and the input of the output filter. The second three-level conductive path is formed by a sixth switch coupled between the input of the output filter and the second terminal of the dc source, and a seventh switch and an eighth switch connected in series and coupled between the input of the output filter and the second terminal of the dc source. The second five-level conductive path is formed by the sixth switch coupled between the input of the output filter and the second terminal of the dc source, a ninth switch coupled between an output of the second boost apparatus and the input of the output filter, and the seventh switch and a tenth switch connected in series and coupled between the output of the second boost apparatus and the input of the output filter.

The first three-level conductive path is formed by Q15 coupled between the first terminal of the dc source and the input of the output filter, and Q13 of the freewheeling apparatus, and wherein Q15 and Q13 are connected in parallel. The first five-level conductive path is formed by Q15, Q1 coupled between the output of the first boost apparatus and the input of the output filter, and Q13 of the freewheeling apparatus. The second three-level conductive path is formed by Q16 coupled between the second terminal of the dc source and the input of the output filter, and Q14 of the freewheeling apparatus, and wherein the Q14 and Q16 are connected in parallel. The second five-level conductive path is formed by Q16, Q2 coupled between the output of the second boost apparatus and the input of the output filter, and Q14 of the freewheeling apparatus.

The first three-level conductive path is formed by a first switch coupled between the first terminal of the dc source and the input of the output filter, and a second switch of the freewheeling apparatus, and wherein the first switch and the second switch are connected in parallel. The first five-level conductive path is formed by the first switch, a third switch coupled between the output of the first boost apparatus and the input of the output filter, and the second switch of the freewheeling apparatus. The second three-level conductive path is formed by a fourth switch coupled between the second terminal of the dc source and the input of the output filter, and a fifth switch of the freewheeling apparatus, and wherein the fifth switch and the fourth switch are connected in parallel. The second five-level conductive path is formed by the fourth switch, a sixth switch coupled between the output of the second boost apparatus and the input of the output filter, and the fifth switch of the freewheeling apparatus.

The first three-level conductive path further comprises Q17 connected in series with Q13 of the freewheeling apparatus, and wherein Q17 is configured to be turned on before a turn-on of Q15. The first five-level conductive path further comprises Q19 connected in series with Q13 of the freewheeling apparatus, and wherein Q19 is configured to be turned on before a turn-on of Q1. The second three-level conductive path further comprises Q18 connected in series with Q14 of the freewheeling apparatus, and wherein Q18 is configured to be turned on before a turn-on of Q16. The second five-level conductive path further comprises Q20 connected in series with Q14 of the freewheeling apparatus, and wherein Q20 is configured to be turned on before a turn-on of Q2.

The first three-level conductive path further comprises a seventh switch connected in series with the second switch of the freewheeling apparatus, and wherein the seventh switch is configured to be turned on before a turn-on of the first switch. The first five-level conductive path further comprises an eighth switch connected in series with the second switch of the freewheeling apparatus, and wherein the eighth switch is configured to be turned on before a turn-on of the third switch. The second three-level conductive path further comprises a ninth switch connected in series with the fifth switch of the freewheeling apparatus, and wherein the ninth switch is configured to be turned on before a turn-on of the fourth switch. The second five-level conductive path further comprises a tenth switch connected in series with the fifth switch of the freewheeling apparatus, and wherein the tenth switch is configured to be turned on before a turn-on of the sixth switch.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   detecting a voltage across a dc source coupled to an inverter, wherein the inverter comprises:
   a first boost apparatus having an input coupled to a first terminal of the dc source;
   a second boost apparatus having an input coupled to a second terminal of the dc source;
   a first converting stage comprising a first three-level conductive path and a first five-level conductive path;
   a second converting stage comprising a second three-level conductive path and a second five-level conductive path; and
   a freewheeling network coupled between an input of an output filter and ground, wherein the freewheeling network comprises two switching elements and the input of the output filter is connected to a common node of the two switching elements;
   in a first half cycle of a voltage at an output of the output filter, enabling the first three-level conductive path when a voltage at the first terminal of the dc source is greater than an instantaneous value of the voltage at the output of the output filter;
   in the first half cycle, enabling the first five-level conductive path when the instantaneous value of the voltage at the output of the output filter is greater than the voltage at the first terminal of the dc source;
   in a second half cycle of the voltage at the output of the output filter, enabling the second three-level conductive path when the instantaneous value of the voltage at the output of the output filter is greater than the voltage at the second terminal of the dc source; and
   in the second half cycle, enabling the second five-level conductive path when the voltage at the second terminal of the dc source is greater than the instantaneous value of the voltage at the output of the output filter.

2. The method of claim 1, wherein:
   the first three-level conductive path is formed by a first switch coupled between the input of the output filter and the first terminal of the dc source, and a second switch and a third switch connected in series and coupled between the input of the output filter and the first terminal of the dc source;
   the first five-level conductive path is formed by the first switch coupled between the input of the output filter and the first terminal of the dc source, a fourth switch coupled between an output of the first boost apparatus and the input of the output filter, and the second switch and a fifth switch connected in series and coupled between the output of the first boost apparatus and the input of the output filter;
   the second three-level conductive path is formed by a sixth switch coupled between the input of the output filter and the second terminal of the dc source, and a seventh switch and an eighth switch connected in series and coupled between the input of the output filter and the second terminal of the dc source; and
   the second five-level conductive path is formed by the sixth switch coupled between the input of the output filter and the second terminal of the dc source, a ninth switch coupled between an output of the second boost apparatus and the input of the output filter, and the seventh switch and a tenth switch connected in series and coupled between the output of the second boost apparatus and the input of the output filter.

3. The method of claim 2, further comprising:
turning on the third switch before turning on the first switch;
turning off the first switch before turning off the third switch;
turning on the eighth switch before turning on the sixth switch; and
turning off the sixth switch before turning off the eighth switch.

4. The method of claim 2, further comprising:
turning on the third switch before turning on the first switch;
turning off the third switch after the first switch is turned on;
turning on the third switch before turning off the first switch;
turning off the first switch after the third switch is turned on; and
turning off the third switch.

5. The method of claim 2, further comprising:
turning on the eighth switch before turning on the sixth switch;
turning off the eighth switch after the sixth switch is turned on;
turning on the eighth switch before turning off the sixth switch;
turning off the sixth switch after the eighth switch is turned on; and
turning off the eighth switch.

6. The method of claim 2, further comprising:
turning on the fifth switch before turning on the fourth switch;
turning off the fourth switch before turning off the fifth switch;
turning on the tenth switch before turning on the ninth switch; and
turning off the ninth switch before turning off the tenth switch.

7. The method of claim 1, further comprising:
detecting a peak-to-peak value of the voltage at the output of the output filter;
comparing the peak-to-peak voltage with a voltage across the dc source; and
turning on a first relay, a second relay, a third relay and a fourth relay so as to bypass the first boost apparatus and the second boost apparatus when the voltage across the dc source is greater than the peak-to-peak value of the voltage at the output of the output filter.

8. A method comprising:
providing an inverter coupled to a dc source, wherein the inverter comprises:
a first boost apparatus having an input coupled to a first terminal of the dc source;
a second boost apparatus having an input coupled to a second terminal of the dc source;
a first converting stage comprising:
a first three-level conductive path coupled to the first terminal of the dc source; and
a first five-level conductive path coupled to the first terminal of the dc source and an output of the first boost apparatus;
a second converting stage comprising:
a second three-level conductive path coupled to the second terminal of the dc source; and
a second five-level conductive path coupled to the second terminal of the dc source and an output of the second boost apparatus; and
a freewheeling network coupled between an input of an output filter and ground, wherein the freewheeling network comprises two switching elements and the input of the output filter is connected to a common node of the two switching elements; and
turning on a plurality of relays to bypass the first boost apparatus and the second boost apparatus when a voltage across the dc source is greater than a peak-to-peak value of a voltage at an output of the output filter.

9. The method of claim 8, further comprising:
in a first half cycle of the voltage at the output of the output filter, enabling the first three-level conductive path when a voltage at the first terminal of the dc source is greater than an instantaneous value of the voltage at the output of the output filter.

10. The method of claim 9, further comprising:
in the first half cycle, enabling the first five-level conductive path when the instantaneous value of the voltage at the output of the output filter is greater than the voltage at the first terminal of the dc source.

11. The method of claim 8, further comprising:
in a second half cycle of the voltage at the output of the output filter, enabling the second three-level conductive path when an instantaneous value of the voltage at the output of the output filter is greater than the voltage at the second terminal of the dc source.

12. The method of claim 11, further comprising:
in the second half cycle, enabling the second five-level conductive path when the voltage at the second terminal of the dc source is greater than the instantaneous value of the voltage at the output of the output filter.

13. The method of claim 8, wherein:
the inverter is a five-level inverter.

14. The method of claim 13, wherein:
a first level of the inverter is coupled to the output of the second boost apparatus;
a second level of the inverter is coupled to the second terminal of the dc source;
a third level of the inverter is coupled to ground;
a fourth level of the inverter is coupled to the second terminal of the dc source; and
a fifth level of the inverter is coupled to the output of the second boost apparatus.

15. A device comprising:
a first boost apparatus having an input coupled to a first terminal of a dc source;
a second boost apparatus having an input coupled to a second terminal of the dc source;
a first converting stage coupled to an input of an output filter and the first boost apparatus, wherein the first converting stage is configured such that:
a first three-level conductive path is coupled between the first terminal of the dc source and the input of the output filter when a voltage at the first terminal of the dc source is greater than an instantaneous value of a voltage at an output of the output filter; and
a first five-level conductive path is coupled to the first terminal of the dc source and an output of the first boost apparatus when the instantaneous value of the voltage at the output of the output filter is greater than the voltage at the first terminal of the dc source;

a second converting stage coupled to the input of the output filter; and a freewheeling apparatus coupled between the input of the output filter and ground, wherein the freewheeling apparatus comprises two switching elements and the input of the output filter is connected to a common node of the two switching elements.

16. The device of claim 15, wherein the second converting stage is configured such that:

a second three-level conductive path is coupled between the second terminal of the dc source and the input of the output filter when the instantaneous value of the voltage at the output of the output filter is greater than a voltage at the second terminal of the dc source; and a second five-level conductive path is coupled to the second terminal of the dc source and an output of the second boost apparatus when the voltage at the second terminal of the dc source is greater than the instantaneous value of the voltage at the output of the output filter.

17. The device of claim 16, wherein:

the first three-level conductive path is formed by a first switch coupled between the first terminal of the dc source and the input of the output filter, and a second switch of the freewheeling apparatus, and wherein the first switch and the second switch are connected in parallel;

the first five-level conductive path is formed by the first switch, a third switch coupled between the output of the first boost apparatus and the input of the output filter, and the second switch of the freewheeling apparatus;

the second three-level conductive path is formed by a fourth switch coupled between the second terminal of the dc source and the input of the output filter, and a fifth switch of the freewheeling apparatus, and wherein the fifth switch and the fourth switch are connected in parallel; and the second five-level conductive path is formed by the fourth switch, a sixth switch coupled between the output of the second boost apparatus and the input of the output filter, and the fifth switch of the freewheeling apparatus.

18. The device of claim 17, wherein:

the first three-level conductive path further comprises a seventh switch connected in series with the second switch of the freewheeling apparatus, and wherein the seventh switch is configured to be turned on before a turn-on of the first switch;

the first five-level conductive path further comprises an eighth switch connected in series with the second switch of the freewheeling apparatus, and wherein the eighth switch is configured to be turned on before a turn-on of the third switch;

the second three-level conductive path further comprises a ninth switch connected in series with the fifth switch of the freewheeling apparatus, and wherein the ninth switch is configured to be turned on before a turn-on of the fourth switch; and the second five-level conductive path further comprises a tenth switch connected in series with the fifth switch of the freewheeling apparatus, and wherein the tenth switch is configured to be turned on before a turn-on of the sixth switch.

19. The device of claim 15, wherein:

the first converting stage and the second converting stage are configured such that the first boost apparatus and the second boost apparatus are bypassed when a voltage across the dc source is greater than a peak-to-peak value of the voltage at the output of the output filter.

20. The device of claim 15, wherein:

the first boost apparatus comprises a first input inductor, a first low side switch and a first blocking diode; and the second boost apparatus comprises a second input inductor, a second low side switch and a second blocking diode.

* * * * *